US007826544B2

United States Patent
Bick et al.

(10) Patent No.: US 7,826,544 B2
(45) Date of Patent: Nov. 2, 2010

(54) OFDM SIGNAL ACQUISITION

(75) Inventors: Eyal Bick, Ra'anana (IL); Uri Perlmutter, Holon (IL)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 11/824,600

(22) Filed: Jun. 29, 2007

(65) Prior Publication Data

US 2009/0003471 A1  Jan. 1, 2009

(51) Int. Cl.
*H04K 1/10* (2006.01)
(52) U.S. Cl. ...................... 375/260; 370/208
(58) Field of Classification Search ............ 375/260, 375/343, 354; 370/208, 280
See application file for complete search history.

(56) References Cited

U.S. PATENT DOCUMENTS

| 2006/0078040 | A1* | 4/2006 | Sung et al. | 375/140 |
| 2006/0239179 | A1* | 10/2006 | Berkeman et al. | 370/208 |
| 2007/0280098 | A1* | 12/2007 | Bhatt et al. | 370/208 |
| 2008/0137563 | A1* | 6/2008 | Wang | 370/280 |

* cited by examiner

*Primary Examiner*—David C Payne
*Assistant Examiner*—Leon-Viet Q Nguyen
(74) *Attorney, Agent, or Firm*—Ryder, Lu, Mazzeo and Konieczny, LLC; Douglas J. Ryder

(57) ABSTRACT

In general, in one aspect, the disclosure describes a method defining order and means in which physical parameters of a received OFDM signal may be detected. A fractional frequency offset is determined for the OFDM signal and is used to determine a coarse location for received signal preamble. A symbol boundary is determined based on the coarse location and the course location is used to determine preamble location. A preamble sequence and integer frequency offset is determined based on the preamble location.

20 Claims, 1 Drawing Sheet

OFDM SIGNAL ACQUISITION

BACKGROUND

Wireless network, including wireless metropolitan area networks (WMAN) such as those compliant with the IEEE standard 802.16.x (WiMAX), may communicate using Orthogonal Frequency Division Multiplexing (OFDM) signaling. An OFDM signal is comprised of multiple sub-carriers each modulated at a symbol rate equal to the reciprocal of the frequency separation. WiMAX networks may assign neighboring base stations different preambles. The preambles are included as the first OFDM signal in a WiMAX frame and may be selected from a set of 114 symbols. The preamble symbols from different base stations may use the same frequencies and therefore interfere with each other, causing negative signal to noise ratio (SNR) at cell edge.

During signal acquisition with a particular base station a WiMAX OFDM receiver in the wireless device does not know what preamble is associated with the base station, or the frequency or timing offsets associated with the signals. As a result, preamble detection needs to account for uncertainties in preamble, frequency and time at a SNR below zero. Searching for all unknowns at the same time may result in high error rate.

BRIEF DESCRIPTION OF THE DRAWINGS

The features and advantages of the various embodiments will become apparent from the following detailed description in which.

DETAILED DESCRIPTION

Figure 1:
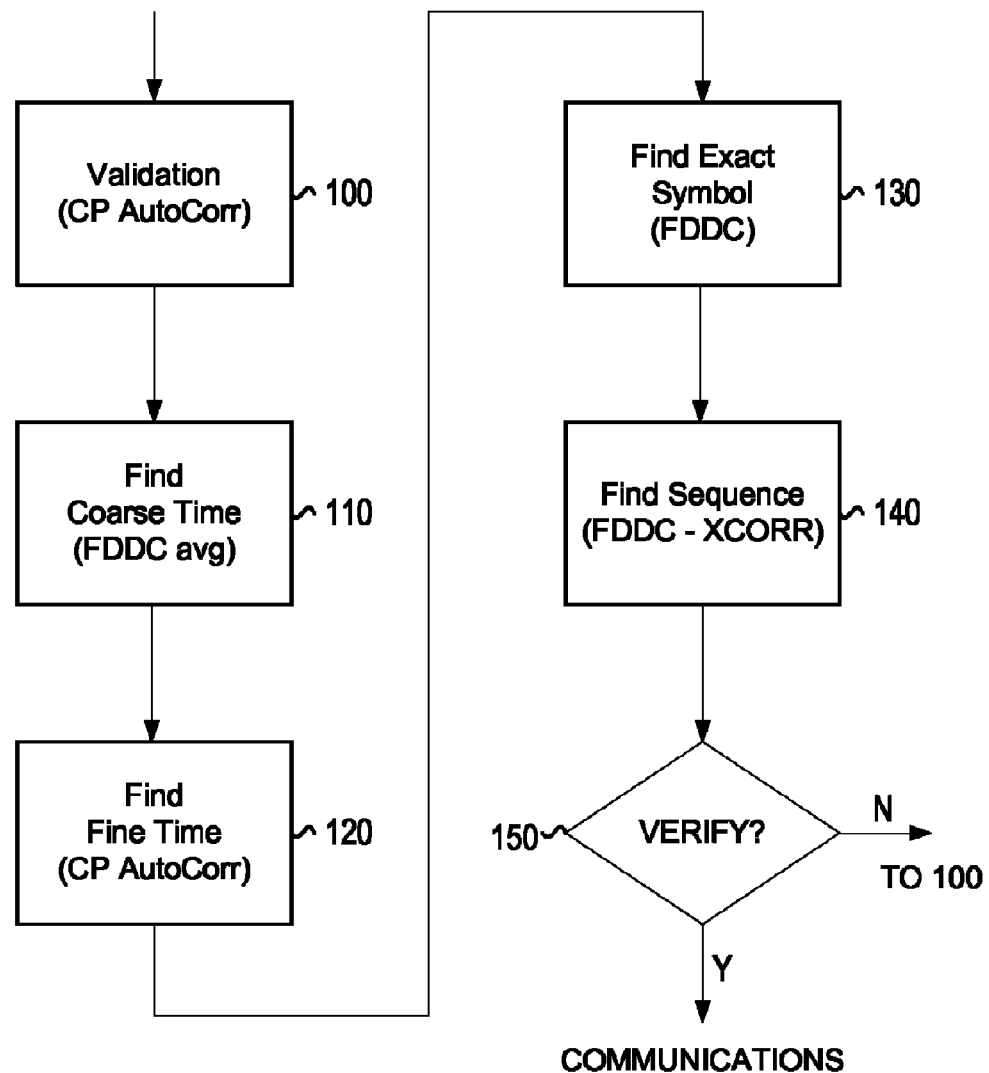
FIG. 1 illustrates an example flow for WiMAX OFDM signal acquisition, according to one embodiment.

An OFDM receiver may connect to one or more antennas to receive the signals, one of more hardware detectors (programmable engines, hard coded logic for ASICs) to perform various calculations on the received signals in order to determine the time frequency and preamble associated with the signal, and a processor (CPU) for controlling operation of the receiver. Each hardware detector may include a single detector calculation or may include multiple calculations. For example, one hardware detector may include all time domain calculations and one may include all frequency domain calculations. The CPU may perform operations on the signals as they pass from detector to detector (or calculation to calculation within a detector).

FIG. 1 illustrates an example flow for WiMAX OFDM signal acquisition. The flow is broken down into various functions, some of the functions are performed in time domain and others are performed in frequency domain. When a signal is received at an OFDM receiver a CPU may set parameters (e.g., radio frequency (RF) carrier, bandwidth (BW), fast Fourier transforms (FFT), cyclic prefix (CP), and frame size with maximum gain). A validation process 100 is performed on the received signal in the time domain to determine the fractional frequency offset of the signal. The process 100 includes time domain CP auto correlation over all frame symbols, $$AutoCorr\{r(t)\} = \int_0^{cp} r(t) \cdot r*(t+T) dt,$$

where T is the symbol duration and cp is the CP duration. Auto correlation output summation (ACS) is used to form a signal of one symbol length, $$ACS(t) = \sum_{n=0}^{N-1} AutoCorr\{r(t+nT)\} \text{ for } 0 < t < T,$$

where N is the number of full symbols in a frame.

The peak of this signal, $t_{max}$=arg max(|ACS(t)|), can be used to determine the symbol boundaries (however not at this point because the whole frame was processed) and the fractional frequency offset (frequency offset modulo carrier spacing). The fractional frequency offset can be calculated from the phase of the auto correlation peak, $F_{frac[Hz]}$=phase(ACS($t_{max}$))($2\pi$)×$\Delta F_{spacing}$, where $\Delta F_{spacing}$ is the carrier spacing. The fractional frequency offset provides the OFDM sub-carrier that was utilized.

The process now shifts to the frequency domain. The CPU may set a numerically controlled oscillator (NCO) for frequency correction, choose automatic gain control (AGC) settings, and prepare the hardware descriptions for a find course time (symbol) process 110. The process 110 is performed to find the preamble location in time (frame boundaries) within ±1 symbols since the time offset is unknown. The process 110 includes performing frequency domain differential correlation (FDDC) calculations which test hypothesis related to the preamble over multiple (N) frames and averaging the FDDC (AFDDC) for each preamble hypothesis, $$AFDDC(z) = \sum_{k=0}^{Nframes-1} \max_{\substack{x \in X \\ y \in Y}} \{FDDC(x, y, z, k)\},$$

where k is the frame number, X is the range of possible preambles, Y is the range of possible frequency offset (FFT bins), and z is the symbol number. The preamble symbol is the best hypothesis (maxima of the AFDDC results), PreamSym=arg max{|AFDDC(z)|}.

The CPU may set the frame start to roughly the preamble symbol, prepare the hardware descriptions for a find fine time process 120. The process 120 includes performing CP auto correlation (see 100) using only the downlink (DL) portion of the frame. We know the DL portion of the frame since the find course time process 110 provided an estimate of the preamble location. The peak of the ACS signal generated using only the DL, $t_{max}$=arg max(|ACS(t)|), is the symbol boundary (OFDM preamble start).

The CPU may prepare the hardware descriptions for a find exact symbol process 130 and identify 3 symbols (the symbol identified in 110±1 symbol). The process 130 includes performing FDDC calculations on the three possible preambles to determine which is the exact preamble.

The CPU then aligns the frame start to the preamble symbol, sets AGC, and sets for a find sequence process 140. The process 140 is to find the preamble sequence and the complete FFT bins (integer frequency offset). Since the timing and the sequence of the signal have been determined finding the preamble sequence will be easier. The process 140 may include FDDC calculations to test hypothesis regarding the preamble sequence. The process 140 may also include cross correlation (XCORR) calculations that include converting the frequency back to time using inverse FFT. The FDDC calculations may not be accurate due to the integer frequency offset and the XCORR may require to much computational resources so a combination of the two may be used. Once the preamble sequence is determined the integer frequency offset can be determined and the total frequency offset can be calculated as the integer offset just determined plus the fractional frequency offset determined in 100.

The CPU sets the preamble and the frequency offset and set the receiver for normal receive mode. The receiver then tries to verify the signal acquisition by receiving a DL map signal with correct error coding (e.g., cyclic redundancy check (CRC)) 150. If the map is received (150 yes) then the signal acquisition is complete and the receiver can continue communications with the base station. If the map is not received (150 no) the signal acquisition was not successful and the process returns to 100.

As discussed, the preamble detection required for signal acquisition is divided into phases where each phase is intended to detect physical parameters which are the easiest to detect at that point. This results in detection performance within the required SNR (e.g., below zero dB).

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method comprising
receiving an OFDM signal;
determining a fractional frequency offset of the OFDM signal, wherein the determining includes performing a time domain cyclic prefix auto correlation (TDCPAC) of symbols within a frame of the OFDM signal;
selecting a frequency domain associated with the fractional frequency offset;
determining a coarse location for a preamble of the OFDM signal, wherein the determining includes performing a frequency domain differential correlation (FDDC) on possible preambles;
determining downlink portion of a frame of the OFDM signal based on the course location of the preamble;
aligning a frame start with the course location of the preamble;
determining a symbol boundary, wherein the determining includes performing a TDCPAC of symbols within the downlink portion of a frame of the OFDM signal;
aligning a frame start with the symbol boundary;
determining preamble location, wherein the determining includes performing a FDDC on possible preambles within the course location of the preamble;
aligning a frame start with the preamble location; and
determining preamble sequence and integer frequency offset.

2. The method of claim 1, wherein the determining a fractional frequency offset further includes summating the auto correlations, and finding peak of the summation, wherein phase of the peak is the fractional frequency offset.

3. The method of claim 1, wherein the determining a coarse location further includes performing the FDDC of possible preambles over multiple frames and averaging the FDDCs.

4. The method of claim 1, wherein the course location of the preamble is a range of symbols.

5. The method of claim 1, wherein the determining a symbol boundary further includes summating the auto correlations, and finding peak of the summation, wherein the peak is the symbol boundary.

6. The method of claim 1, wherein the determining preamble sequence and integer frequency offset includes performing a FDDC for possible preamble sequences.

7. The method of claim 1, wherein the determining preamble sequence and integer frequency offset includes performing a cross correlation (XCORR) between the received signal preamble and possible preamble sequences.

8. The method of claim 1, wherein the determining preamble sequence and integer frequency offset includes performing a FDDC and XCORR.

9. An apparatus including
at least one antenna to receive OFDM signals;
a detector to perform calculations on the received OFDM signals;
a processor to control operations of the detector, wherein for signal acquisition the processor is to instruct the detector to perform a cyclic prefix auto correlation (CP AutoCorr) to determine fractional frequency offset, to perform an averaging frequency domain differential correlation (AFDDC) to determine preamble location within a range of symbols, to perform a CP AutoCorr to determine symbol start, to perform a FDDC to determine preamble location, and to perform a FDDC to identify preamble index.

10. The apparatus of claim 9, wherein the detector includes a time domain detector to perform calculations in the time domain and a frequency domain detector to perform calculations in the frequency domain.

11. The apparatus of claim 9, wherein the processor further instructs the detector to perform cross correlations (XCORR) to identify the preamble index.

12. A method comprising
receiving an OFDM signal;
performing a time domain cyclic prefix auto correlation (TDCPAC) of symbols within a frame to determine a fractional frequency offset of the OFDM signal, wherein the fractional frequency offset of the received signal provides an OFDM sub-carrier utilized to transmit the OFDM signal;
performing an averaging frequency domain differential correlation (AFDDC) over several frames to estimate preamble location within the OFDM sub-carrier, wherein the estimated preamble location is within a range of symbols;
performing a TDCPAC on downlink portion of a frame to determine symbol start, wherein the downlink portion is determined based on the estimated preamble location;
performing an FDDC on the range of symbols aligned in time to the symbol start to determine preamble location, wherein the preamble location is the selected symbol; and
determining preamble sequence and integer frequency offset based on the preamble location.

13. The method of claim 12, further comprising summating the TDCPAC for the symbols within the frame and finding a peak of the summation, wherein the fractional frequency offset is determined from phase of the peak.

14. The method of claim 12, further comprising summating the TDCPAC for the symbols within the downlink portion of the frame and finding a peak of the summation, wherein the peak is the symbol start.

15. The method of claim 12, wherein the determining preamble sequence and integer frequency offset includes performing an FDDC of possible preamble sequences based on the preamble location.

16. The method of claim 12, wherein the determining preamble sequence and integer frequency offset includes performing a cross correlation (XCORR) to possible preamble sequences.

17. The method of claim 12, wherein the determining preamble sequence and integer frequency offset includes performing an FDDC of and a cross correlation (XCORR) to possible preamble sequences.

18. The method of claim 12, further comprising determining total frequency offset by adding integer frequency offset and fractional frequency offset.

19. The method of claim 18, further comprising:
setting the preamble sequence and the total offset frequency;
entering normal receive mode; and
verifying signal acquisition.

20. The method of claim 19, wherein the verifying signal acquisition includes receiving a downlink map signal with correct error coding.

* * * * *